United States Patent
Rodriguez Hervas et al.

(10) Patent No.: US 12,233,854 B2
(45) Date of Patent: Feb. 25, 2025

(54) PERCEPTION-BASED PARKING ASSISTANCE FOR AUTONOMOUS MACHINE SYSTEMS AND APPLICATIONS

(71) Applicant: NVIDIA Corporation, Santa Clara, CA (US)

(72) Inventors: Berta Rodriguez Hervas, San Diego, CA (US); Hang Dou, Fremont, CA (US); Kexuan Zou, San Jose, CA (US); Hsin-I Chen, Sunnyvale, CA (US); Nizar Gandy Assaf, San Jose, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 289 days.

(21) Appl. No.: 17/690,865

(22) Filed: Mar. 9, 2022

(65) Prior Publication Data

US 2023/0311855 A1 Oct. 5, 2023

(51) Int. Cl.
*B60W 30/06* (2006.01)
*B60W 50/14* (2020.01)
(Continued)

(52) U.S. Cl.
CPC ............ *B60W 30/06* (2013.01); *B60W 50/14* (2013.01); *B60W 60/001* (2020.02);
(Continued)

(58) Field of Classification Search
CPC ................. B60W 30/06; B60W 50/14; B60W 2050/146; B60W 2552/02;
(Continued)

(56) References Cited

U.S. PATENT DOCUMENTS 10,106,153 B1 * 10/2018 Xiao ...................... B62D 15/02
10,885,698 B2  1/2021 Muthler et al.
(Continued)

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
(Continued)

*Primary Examiner* — Spencer D Patton
(74) *Attorney, Agent, or Firm* — Shook, Hardy & Bacon L.L.P.

(57) ABSTRACT

In various examples, perception-based parking assistance systems and methods for an ego-machine are presented. Example embodiments may determine a location of a real-world parking strip relative to an ego-machine and an associated parking rule for the parking strip. A virtual parking strip and one or more virtual parking signs may be generated based at least in part on one or more detected features in an environment of the ego-machine and a tracked motion of the ego machine, and the virtual parking strip may be used to track parking strip locations and associated parking rules. The virtual parking strips and associated rules may be relied upon by an ego-machine to determine parking locations and/or to navigate into a suitable parking spot.

24 Claims, 10 Drawing Sheets

(51) Int. Cl.
*B60W 60/00* (2020.01)
*G06V 20/56* (2022.01)
*G06V 20/58* (2022.01)

(52) U.S. Cl.
CPC ....... *G06V 20/586* (2022.01); *B60W 2552/05* (2020.02); *B60W 2552/53* (2020.02); *B60W 2554/802* (2020.02); *B60W 2555/60* (2020.02)

(58) Field of Classification Search
CPC ......... B60W 2552/53; B60W 2554/60; B60W 2554/802; B60W 2555/60; G06V 20/56; G06V 20/58; G06V 20/582; G06V 20/586; G06V 20/588
See application file for complete search history.

(56) References Cited

U.S. PATENT DOCUMENTS

| | | | | |
|---|---|---|---|---|
| 11,010,907 | B1* | 5/2021 | Bagwell | G05D 1/0221 |
| 11,524,705 | B2* | 12/2022 | Tsuji | G05D 1/0268 |
| 2016/0343139 | A1* | 11/2016 | Diegmann | G06V 20/588 |
| 2018/0308358 | A1* | 10/2018 | Hayakawa | G08G 1/143 |
| 2020/0257909 | A1* | 8/2020 | Korman | G08G 1/0141 |
| 2020/0324787 | A1* | 10/2020 | Wang | B60W 50/14 |
| 2023/0091062 | A1* | 3/2023 | Challa | G06V 20/582 382/104 |

OTHER PUBLICATIONS

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201806, pp. 1-35 (Jun. 15, 2018).

* cited by examiner

400

DETECT, BASED AT LEAST IN PART ON SENSOR DATA GENERATED USING ONE OR MORE SENSORS OF AN EGO-MACHINE, ONE OR MORE FEATURES INDICATIVE OF PARKING INFORMATION ASSOCIATED WITH AT LEAST A PORTION OF A PLANNED PATH OF THE EGO-MACHINE
B402

COMPUTE A GEOMETRY OF A VIRTUAL PARKING STRIP BASED AT LEAST IN PART ON THE ONE OR MORE FEATURES AND TRACKED MOTION OF THE EGO-MACHINE
B404

ASSOCIATE A PARKING RULE WITH THE VIRTUAL PARKING STRIP BASED AT LEAST IN PART ON THE ONE OR MORE FEATURES
B406

GENERATE A PARKING ASSISTANCE OUTPUT INDICATIVE OF THE PARKING RULE AND THE RELATIVE POSITION OF THE VIRTUAL PARKING STRIP WITH RESPECT TO THE EGO-MACHINE
B408

FIGURE 4

PERCEPTION-BASED PARKING ASSISTANCE FOR AUTONOMOUS MACHINE SYSTEMS AND APPLICATIONS

BACKGROUND

An autonomous or semi-autonomous machine operating on public streets and highways is expected to adhere to parking rules. For example, an autonomous delivery truck will be expected to ascertain where it is permitted to stop in order to find a parking spot to drop-off and pick-up packages, and in order to maintain compliance with parking regulations and avoid interfering with the operation of other machines and vehicles. Designated street-side parking strips are a common feature on streets of urban areas where cars, trucks, and other vehicles or machines can temporarily exit the stream of traffic to stop or park. Depending on how the parking region is marked, and/or where it is located with respect to other features in its environment, an operator of the vehicle can ascertain whether parking or stopping their vehicle in a particular location is prohibited or permitted, and if permitted, under what circumstances. The corresponding parking rules are often displayed by signs around or nearby the parking location, or implied by other features such as the distance to an intersection or the presence of a fire hydrant and/or painted curb. The same is true for parking spaces located in parking lots, where signs or other features are present to communicate what areas of the parking lot are valid parking spaces and which are prohibited parking spaces.

Location based traffic management databases represent one existing technology currently used for vehicle navigation assistance. For example, a modern global position system (GPS) receiver can be used by onboard systems to correlate a vehicle's current position to a database of road sign locations and street maps to indicate to the driver, for example, the current speed limit or upcoming intersections or highway exists, often displaying a graphical representation of an upcoming road sign to the driver. However, the information in such databases is static and prone to becoming obsolete (inaccurate) overtime. Also, the sheer number of objects encountered along a street that convey parking rule information can be substantial. Moreover, temporary changes to parking rules are not uncommon, such as when existing parking signs are temporarily covered by local authorities, which would not be represented in a database. As a result, these traditional systems may rely on out of date information, which may result in the vehicle parking illegally and/or in an undesignated parking spot.

SUMMARY

Embodiments of the present disclosure relate to perception-based parking assistance for autonomous and semi-autonomous machine applications. Systems and methods are disclosed that provide perception-based parking assistance for ego-machines using data captured by on-board sensors. The parsed sensor data includes detailed parking information used to ascertain both the geometry of detected parking strips, and the parking rules corresponding to those parking strips.

For example, and in contrast to conventional systems, such as those described above, the perception-based parking assistance described herein computes a geometry for a virtual parking strip based at least in part on perceived features and/or the tracked motion of the ego-machine. Parking signs and other features observed by a camera or other imaging sensor on-board the ego-machine are used to establish the starting and ending boundaries of a virtual parking strip. As an example, when a first feature is perceived that defines the start of a virtual parking strip, a virtual parking sign is generated at a corresponding location on a path of travel. The tracked motion of the ego-machine is used to extend the length of the virtual parking strip along the path of travel starting from the location of the first feature until one or more second features are perceived that indicate the end of the parking strip. The perceived features may be filtered so that the features used for perception-based parking assistance are those relevant to the current path of travel of the ego-machine. The parsed sensor data may also be used to associate a parking rule with the virtual parking strip. The parking rule can provide parking related information such as: parking is allowed within the virtual parking strip, stopping is allowed within the virtual parking strip, no parking is allowed within the virtual parking strip, or no stopping is allowed within the virtual parking strip. The parking rule may indicate times, dates, and/or other conditions under which the parking rule is applicable. The resulting parking assistance output comprises an output indicative of the parking rule and the relative position of one or more virtual parking strips with respect to the ego-machine. This parking assistance output may be used by one or more downstream components of the ego-machine to either manually or autonomously direct the ego-machine into a parking strip in compliance with the parking rule for that parking strip.

BRIEF DESCRIPTION OF THE DRAWINGS

The present systems and methods for perception-based parking assistance for autonomous machine applications are described in detail below with reference to the attached drawing figures, wherein:

FIG. 4 is a flow diagram illustrating a method for perception-based parking assistance, in accordance with some embodiments of the present disclosure;

DETAILED DESCRIPTION

Figure 1:
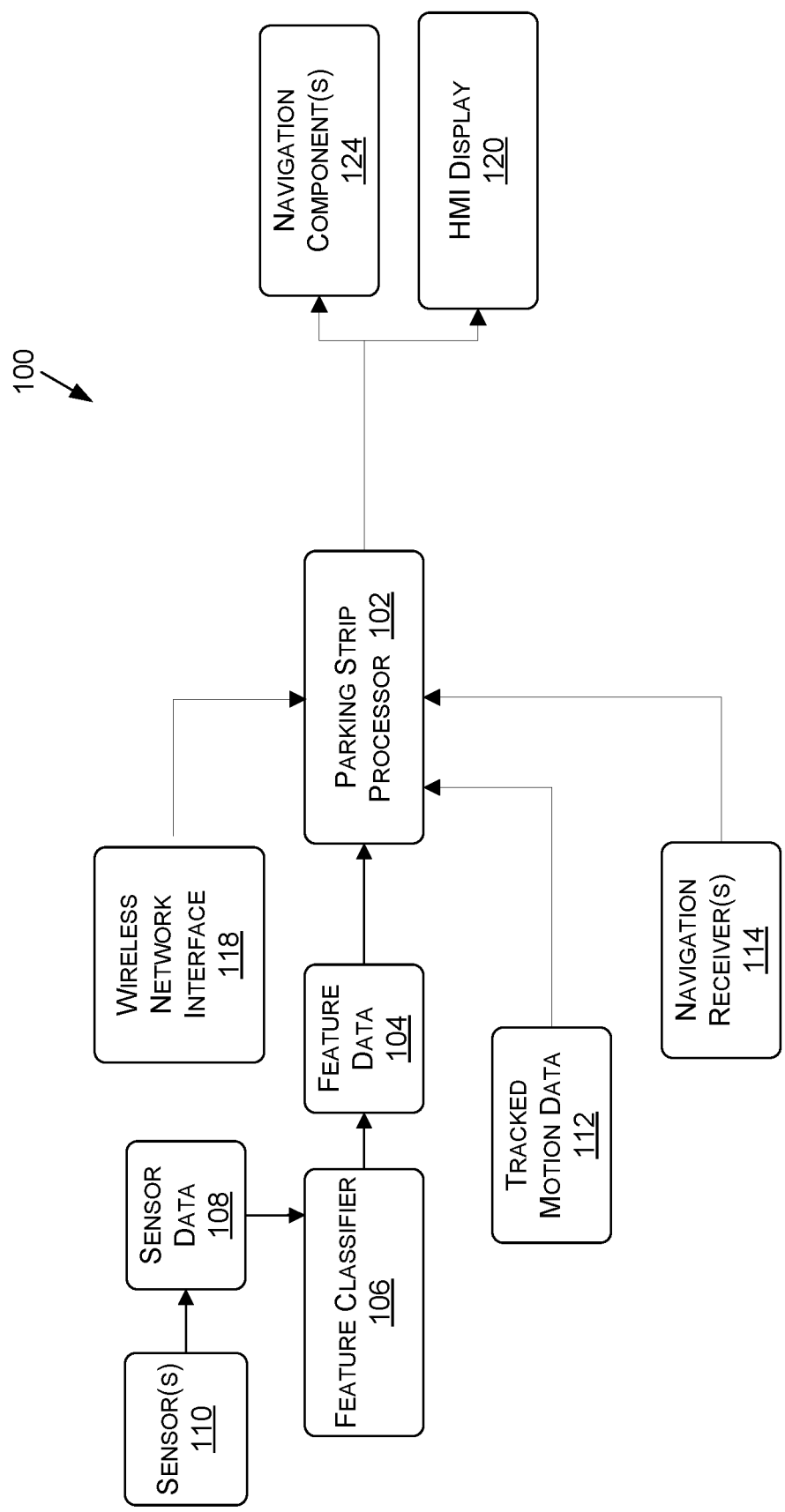
FIG. 1 is a data flow diagram illustrating an example process for a perception-based parking assistance system, in accordance with some embodiments of the present disclosure.

Systems and methods are disclosed related to perception-based parking assistance for autonomous machine applications. Although the present disclosure may be described with respect to an example autonomous vehicle 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to parking assistance for either operator driven or autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where perception-based operation of an ego-machine may be used.

The present disclosure relates to perception-based generation of parking information for use by an autonomous or semi-autonomous machine. More specifically, the systems and methods presented in this disclosure assist an autonomous machine in parsing information obtained from their environment to determine locations where the autonomous vehicle is permitted to stop or park. Embodiments of the present disclosure include, among other things, a perception-based parking assistance system and corresponding methods that parse sensor data captured by on-board sensors. The parsed sensor data includes detailed parking information used to ascertain both the geometry of detected parking strips, and the parking rules corresponding to those parking strips. On-board sensors may include one or more of (without limitation): a camera or other optical sensor, a RADAR sensor, an ultrasonic or other SONAR sensor, LiDAR sensor, a wireless beacon receiver, a GPS or other navigation receiver, and/or other sensors configured to detect characteristics of features in proximity to the ego-machine.

With respect to geometry computation, a virtual parking strip is generated by the perception-based parking assistance system based at least in part on perceived features and the tracked motion of the ego-machine. For example, the geometry for a virtual parking strip may be generated based on parking signs observed by a camera or other imaging sensor on-board the ego-machine. Parking signs that are irrelevant to the planned path of travel of the ego-machine can be filtered out by, for non-limiting example, estimating the distance between the signs and the path. In embodiments, parking signs or other detected features may additionally or alternatively be filtered out based on criteria such as the feature being outside of a trajectory manifold of the ego-machine, being located on a different path than the ego-machine, or when a distance between the ego-machine and the feature is greater than a threshold distance. Features that are relevant to the planned path may be stored to memory as virtual parking signs. In embodiments, the virtual parking signs may not be a same type as the detected sign or feature. For example, a red painted curb may be used to generate a virtual parking sign corresponding to a start of a no parking strip. Similarly, a detected "3 HOUR PARKING" sign may be used to generate a virtual parking sign corresponding to a start of a parking strip.

The geometry of the virtual parking strip may then be computed from the filtered set of features in tandem with the motion of the ego-machine. When a first feature is perceived that defines the start of a virtual parking strip, a virtual parking sign is generated at the corresponding location on the path. The tracked motion of the ego-machine may be used to extend the length of the virtual parking strip along the path of travel starting from the location of the first feature. That is, the length of the virtual parking strip is extended along the path based on the tracked motion of the ego-machine until one or more second features are perceived that indicate the end of the parking strip. The locations of the one or more second features may be used to generate a second virtual parking sign on the path and an ending boundary of the virtual parking strip. It should be noted that the first and second features need not both be signs, or even the same type of features. For example, the parking assist system may generate the start of a virtual parking strip based on the detection of a road-side parking sign, and generate the end of that virtual parking strip in response to detecting an intersection, a color of a surface along the path, and/or a symbol on a surface along the path, as non-limiting examples.

Moreover, in other instances, a single feature may be used to define a virtual parking strip, such as the presence of a bus-stop sign or roadside fire hydrant. In such instances, the length of the virtual parking strip may be predefined, for example from 10 feet before the single feature to 10 feet after, and virtual parking signs may be generated at those locations. Further, the virtual parking strips may be generated for either side of the path based on where the detected features are located, the sequence of their appearance, and/or the information they convey (e.g., as determined using one or more text recognition algorithms, computer vision algorithms, object detection algorithms, machine learning models, neural networks, and/or the like).

As virtual parking signs are generated indicating the starting and/or ending boundaries of a virtual parking strip, the perception-based parking assistance system may compute a relative distance of those virtual parking signs from the ego-machine (e.g., from a reference point of the ego-machine to a projection of the virtual parking sign onto the path). Then, as the ego-machine travels along its path, the tracked motion of the ego-machine is also used to update the relative distances of generated virtual parking signs from the ego-machine and/or from one another. As such, in developing the geometry for a virtual parking strip, the perception-based parking assistance system can be agnostic with respect to any curvature in the path being travelled by the ego-machine. That is, the relative order of virtual parking signs from the features can be maintained in memory (for at least a predetermined duration) along with their relative distance from the ego-machine under the premise that the processed features are on a straight trajectory locally and the relative distance to virtual parking signs either in front of the ego-machine or behind the ego-machine are updated. Keeping virtual parking strips in memory for some duration of time allows the ego-machine to travel forwards and backwards for a least limited distances without needing to re-compute virtual parking strips every time it passes the same set of features. In some embodiments, passed virtual parking signs are removed from memory once their relative distance from the ego-machine is larger than threshold distance. In some embodiments, the stored parking strips may be used to update more long term memory of the environment, such as to update a GNSS map, or to update a high definition (HD) map, with the location, geometry, and/or type of detected parking strips.

In addition to using the detected features to generate the geometry of the virtual parking strip, the parsed sensor data may be used to associate a parking rule with the virtual parking strip. That is, the parking rule may be determined at least in part from information obtained from the detected features. The parking rule can provide parking related information such as: parking is allowed within the virtual parking strip, stopping is allowed within the virtual parking strip, no parking is allowed within the virtual parking strip, or no stopping is allowed within the virtual parking strip. The parking rule may indicate times, dates, and/or other conditions under which the parking rule is applicable. Where parking or stopping is permitted, the parking rule may also indicate if that permission is subject to having a valid permit, such as a disabled parking permit, or if restricted to permitted residents, faculty, or by usage, such as for deliveries only.

In some embodiments, the perception-based parking assistance system may also incorporate sensor data such as signals from navigation beacons or other navigation aids to generate parking strip geometry and/or determine the associated parking rule. For example, the perception-based parking assistance system may receive location information for the ego-machine from a navigation receiver (such as a GPS receiver, satellite navigation system, or other navigation system). Since parking rules vary by county or even within different areas of a country, the perception-based parking assistance system may use ego-machine geographic location information to determine applicable local parking rules for the detected features. For example, in one community, valid legal parking may be allowed up until 10 feet of an intersection while in another community valid legal parking may be allowed up until 15 feet of an intersection. Such information for interpreting parking rules from features may be stored in an onboard memory or data structure.

In some embodiments, the perception-based parking assistance system includes or otherwise communicates with an on-board feature classifier that performs the analysis of the sensor data captured by the on-board sensors to identify features that indicate where the starting and ending of a virtual parking strip are defined, and identify what specific parking rule the features convey. In some embodiments, the feature classifier is implemented with an artificial intelligence (AI) inference engine or other neural-network technology that is trained to recognize features conveying parking information and to parse the corresponding parking rule from the recognized features. The on-board feature classifier may also output a confidence level indicating a confidence in the accuracy of the parking rule that it determines from a feature. For example, if a detected feature is partially obstructed or damaged, the feature classifier may output a parking rule, but also output a confidence level indicating an estimate of the probability that the determined parking rule is correct. The perception-based parking assistance system may then apply a confidence threshold such that it will only indicate a valid parking strip exists if the confidence level exceeds the confidence threshold. Alternately, the perception-based parking assistance system may select and apply a default parking rule (e.g., "no parking allowed") to a parking strip when the confidence level falls below the confidence threshold.

The planned path travelled by the ego-machine is not limited to any one type of path or surface and may include paths such as a highway, a paved road, an unpaved road, a driveway, a portion of a parking lot, a trail, a track, a waterway, a walking path, a delineated portion of an environment; or even a flight route, or any other circumstance where an ego-machine is expected to maneuver to a designated area to park or stop. For example, for a parking lot, the perception-based parking assistance system may correlate a sensor detected feature to a parking space (e.g., based on a projection of the detected feature into the parking space to generate a virtual parking sign) and parse from the feature the parking rule for that parking space.

The output generated by the perception-based parking assistance system may include a parking assistance output indicative of the parking rule and the relative position of the virtual parking strip with respect to the ego-machine. This parking assistance output may be used by one or more downstream components of the ego-machine—such as a world model manager, a path planner, a control component, a localization component, an obstacle avoidance component, an actuation component, and/or the like—to perform one or more operations for controlling the ego-machine through an environment. In some embodiments, communication between the perception-based parking assistance system and such downstream components of the ego-machine is implemented by the perception-based parking assistance system via an application programing interface (API).

For semi-autonomous ego-machines (or ego-machines operating in a semi-autonomous mode), the relative position of the virtual parking strips can be displayed to the ego-machine operator (e.g., on a heads-up windshield display or other display screen) to assist the operator in deciding when the ego-machine is at or near a location where it can stop or park. Such a display can include any or all of: a first virtual parking strip that the ego-machine has passed, a second virtual parking strip that the ego-machine is traveling adjacent to, and/or a third virtual parking strip that the ego-machine is about to enter, or any combination of these on either side of the path being travelled by the ego machine. In some embodiments, the display for each virtual parking strip would also include the virtual parking signs located at the start and end of each virtual parking strip, along with a graphical representation of the parking rule associated with that strip. In some embodiments, the display of each virtual parking sign comprises either a standardized replica of the feature from which the virtual parking sign was generated, or another graphic or icon representative of the feature.

In other embodiments where the ego-machine has a higher degree of autonomy, the output generated by the perception-based parking assistance system comprises a set of data stored to a memory or otherwise transmitted to another ego-machine system that implements automated parking navigation functions. In one such an embodiment, the automated parking navigation functions input the output generated by the perception-based parking assistance system to identify a valid virtual parking strip for the ego-machine to park or stop within, and then executes its functions to navigate the ego-machine into a physical location associated with the valid virtual parking strip. That valid parking strip may be one located immediately adjacent to and along the path where the ego-machine is currently located, a parking strip the ego-machine is about to enter ahead on the path, or a parking strip that the ego-machine has recently passed.

The perception-based parking assistance system and corresponding methods may be executed at least in part on one or more processing units coupled to a memory. The processing unit(s) are programmed to execute code to implement one or more of the features and functions of the perception-based parking assistance system to compute geometry of virtual parking strips, and to associate a parking rule with the virtual parking strips. The geometry and parking rule are determined by the processing unit(s) from features indicative of parking information identified by the feature classifier. While in some embodiments, all processing is performed onboard the ego-machine, in other embodiments, features and functions of the perception-based parking assistance system may be distributed and performed by a combination of onboard processors and cloud computing resources, and sensor data obtained from onboard sensors augmented with supplemental data obtained from a data center or other server. In such implementations, the ego-machine further comprises at least one wireless communication interface for coupling the perception-based parking assistance system to a wireless communications network.

With reference to FIG. 1, FIG. 1 is an example data flow diagram illustrating the interconnection of components and flow of information or data for a perception-based parking assistance system 100 for an ego-machine (such as autonomous vehicle 500 discussed below with respect to FIG. 5A), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory (e.g., such as a tangible memory storage device having a non-transient physical form). In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

The term "parking" as used in conjunction with the terms "parking strip(s)" and "parking sign(s)", "parking information", and so forth, is intended to be inclusive as applicable to both parking and stopping scenarios. Generally, stopping may include a deliberate break in the journey of the ego-machine that is not caused by a traffic situation or traffic control order (such as in obeying the instructions of a traffic light, yield or stop sign, or public safety officer). An ego-machine would typically be considered parked when the operator leaves the ego-machine and/or it is stopped for longer than a certain time duration (for example, 3 minutes). If a parking rule indicates that stopping is not allowed within a parking strip, that indication further implies a parking rule that parking not allowed within that parking strip. If a parking rule indicates that parking is allowed within a parking strip, that indication further implies a parking rule that stopping is also allowed within that parking strip. However, a parking rule that only indicates that parking is not allowed within a parking strip can infer that stopping is allowed within that parking strip as a temporarily stop such as to load or discharge items or passengers.

As shown in FIG. 1, the perception-based parking assistance system executing the process 100 includes a parking strip processor 102 that may input feature data 104 and extract parking information used by the parking strip processor 102 to ascertain the geometry of detected parking strips, and the parking rules corresponding to those parking strips. In this example, the feature data 104 may be derived from sensor data 108 captured by one or more on-board sensors 110 of an ego-machine (e.g., ego-machine 500 of FIGS. 5A-5D). In embodiments, a feature classifier 106 may be coupled to the sensors 110 to perform an analysis of the sensor data 108 captured by the sensors 110 to identify features that indicate where the starting and ending of a virtual parking strip are defined, and identify what specific parking rule the features convey. The feature classifier 106 may be implemented with an artificial intelligence (AI) inference engine or other neural-network technology that is trained to recognize features conveying parking information, and in some embodiments to also parse corresponding parking rule information from the recognized features. The feature classifier 106 may also output a confidence level to the parking strip processor 102 indicating a confidence level in the accuracy of the parking rule information that it determines from the sensor data 108. Parking strip processor 102 may receive tracked motion data 112 as input, which may include information about motion of the ego-machine ("ego-motion")—such as the speed, velocity, pose, and location of the ego-machine as it travels along its planned path. For example, speed and velocity information may be input from controller(s) 536 and/or sensor 544 discussed below. Once a first feature defining the start of a virtual parking strip is perceived by the parking strip processor 102 from the feature data 104, the tracked motion of the ego-machine motion as indicated by the tracked motion data 112 may be used to extend the length of the virtual parking strip along the path of travel starting from the location of the first feature. The length of the virtual parking strip may be extended along the path based on the tracked motion data 112 of the ego-machine until one or more second features are perceived from the feature data 104 that indicate the end of the parking strip. In embodiments, even where no end to the current parking strip is detected, the parking strip may be ended after some threshold distance (e.g., 20 meters, 30 meters, etc.), and a new parking strip may be started.

As shown in FIG. 1, the perception-based parking assistance system may include a feature classifier 106 that inputs feature data 104 and extracts parking information used by the parking strip processor 102 to ascertain the geometry of detected parking strips, and the parking rules corresponding to those parking strips. The feature data 104 and extracted parking information may also be used by the parking strip processor 102 to determine and associate the parking rules corresponding to the virtual parking strips. The parking rule may be determined at least in part from information obtained from the detected feature data 104. The parking rule can provide parking related information such as: parking is allowed within the virtual parking strip, stopping is allowed within the virtual parking strip, no parking is allowed within the virtual parking strip, or no stopping is allowed within the virtual parking strip. As discussed above, in some embodiments, the parking strip processor 102 may also receive location information from navigation receiver(s) 114 in order to determine what set of local laws or regulations apply when certain features are detected. The navigation receiver(s) 114 may comprise, as non-limiting examples, a GNSS receiver (e.g., a GPS receiver), satellite navigation system, or other navigation system. For example, the parking strip processor 102, upon detecting a feature that does not inherently convey parking information (e.g., such as an intersection, a driveway, a sidewalk ramp, unmarked train tracks, or a fire hydrant), can refer to a local parking rule policy in effect for the ego-machine's current location to determine the parking rule for that detected feature, and associate that rule into the virtual parking strip accordingly. As another example, detecting that the ego-machine is travelling through a tunnel may convey a parking rule (e.g., no parking or stopping) unless other detected feature indicate a parking rule to the contrary. Other features that convey parking information and/or a parking rule may include a color of a surface along the path, or a symbol on a surface along the path. For example, a red color on a curb or surface may indicate no stopping, standing, or parking (buses may stop at a red zone marked for buses), a red color on a curb or surface may indicate parking is prohibited, but a vehicle may be allowed to stop for picking up and loading passengers for a certain time, a white color on a curb or surface may indicate stopping is permitted only long enough to pick up or drop off passengers or other limited duration delivery (e.g., deposit mail in mailbox), a blue color on a curb or surface may indicate disabled permit parking only, and/or a green color on a curb or surface may indicate parking is allowed for a limited time as posted on the curb or sign.

In some embodiments, the parking strip processor 102 may be coupled to a wireless network interface 118 so that when the ego-machine enters (or is about to enter) a region for which it does not have a local parking rule policy, it can query a cloud based service (or server) to download the local parking rule policy.

Figure 2:
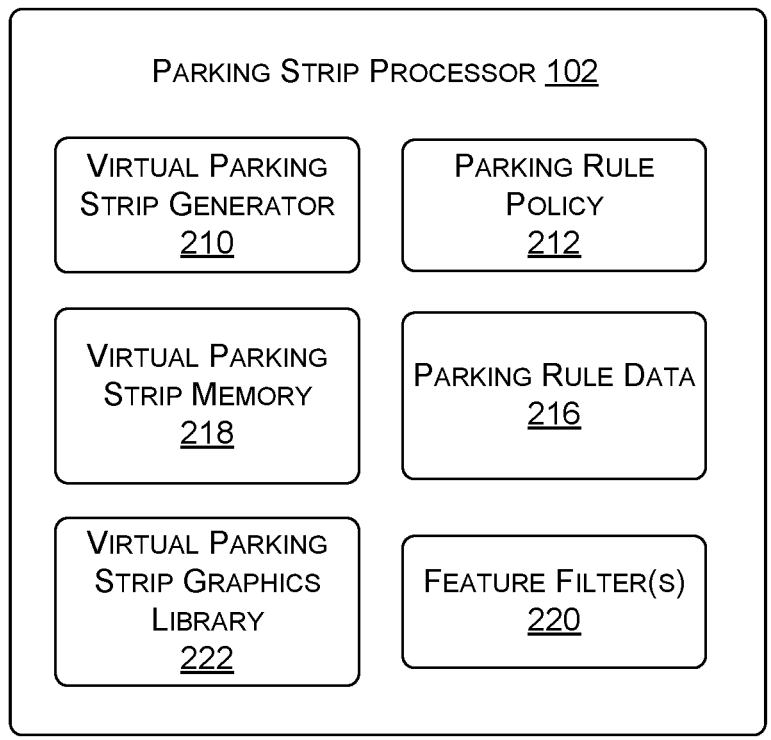
FIG. 2 is a block diagram illustrating an example parking strip processor, in accordance with some embodiments of the present disclosure.

FIG. 2 is a block diagram illustrating an example parking strip processor 102 for one embodiment. As shown in FIG. 2, the parking strip processor 102 comprises a virtual parking strip generator 210 and parking rule policy 212. The virtual parking strip generator 210 may input the feature data 104 and tracked motion data 112 and compute the geometry of a virtual parking strip, as described above. The virtual parking strip generator 210 may also apply the feature data 104 to the parking rule policy 212 to assign the appropriate parking rule to the virtual parking strip. In some embodiments, when confidence in the parking rule as determined from the feature data 104 is less than a confidence threshold, the parking rule policy 212 may indicate a default parking rule (e.g., "no parking allowed") to apply to the virtual parking strip. The parking rule policy 212 may be augmented with parking rule data 216 that includes one or more local parking rule policies stored in memory. As virtual parking strips are generated by the virtual parking strip generator 210, information about the virtual parking strips may be stored to a virtual park strip memory 218. For example, virtual park strip memory 218 may include a history of previously computed virtual parking signs generated for each virtual parking strip, along with their relative distance from the ego-machine and/or from each other. The virtual parking strip generator 210 may further update such relative distances for virtual parking signs stored in the virtual park strip memory 218 based on the tracked motion data 112.

In some embodiments, parking signs or other detected features present in the feature data 104 that are irrelevant to the planned path of travel of the ego-machine can be filtered out by one or more feature filters 220. As a non-limiting example, the feature filters 220 can estimate the distance between the detected features, the path, and or the ego-machine, and filter out those with a distance greater than a specified distance threshold. In embodiments, parking signs or other detected feature may additionally or alternatively be filtered out by the features filter(s) 220 based on criteria such as the feature being outside of a trajectory manifold of the ego-machine, being located on a different path than the ego-machine, etc.

The output from the parking strip processor 102 may include a parking assistance output indicative of the parking rule and the relative position of the virtual parking strip with respect to the ego-machine. This parking assistance output may be used by one or more downstream navigation components 124 of the ego-machine such as the controller(s) 536 discussed below. The downstream navigation components 124, for example, may implement automated parking navigation functions that input the parking assistance output from the parking strip processor 102 to identify a valid virtual parking strip for the ego-machine to park or stop within, and then may execute its functions to operate the propulsion system 550 and steering system 554 to navigate the ego-machine into a physical location associated with the valid virtual parking strip.

For semi-autonomous ego-machines (or ego-machine operating in a semi-autonomous mode), the parking assistance output may be input by a human-machine interface (HMI) 118 comprising a display (e.g., on a heads-up windshield display or other display screen) to the operator of the ego-machine. In embodiments, the relative position of virtual parking strips generated by the parking strip processor 102 can be displayed to the HMI 120 to assist the operator in deciding when the ego-machine is at or near a location where it can stop or park. Such a display can include any or all of: a first virtual parking strip that the ego-machine has passed, a second virtual parking strip that the ego-machine is traveling adjacent to, and/or a third virtual parking strip that the ego-machine is about to enter, or any combination of these on either side of the path being travelled by the ego machine.

Figure 3:
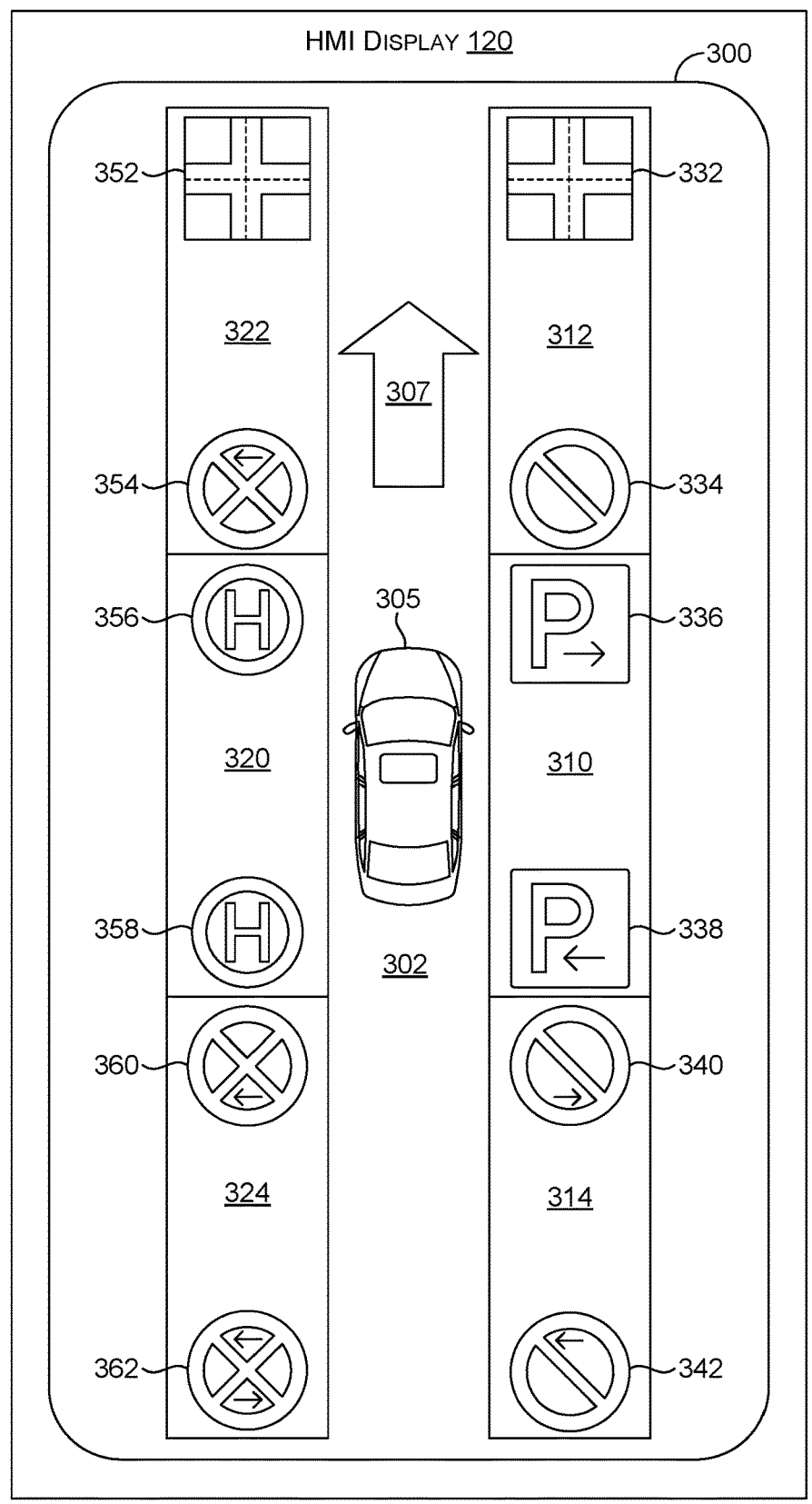
FIG. 3 is a diagram illustrating an example graphical display of virtual parking strips, in accordance with some embodiments of the present disclosure.

FIG. 3 is a diagram illustrating an example graphical display 300 (e.g., for display of virtual parking strips generated by the parking strip processor 102 on HMI Display 120). As shown in FIG. 3, the virtual parking strip generator 210 presents onto the HMI display 120 a graphical representation or icon of the ego-machine (shown at 305) traveling on a path 302 with an indicated direction of travel 307. In this particular example, to the right of the ego-machine icon 305, a virtual parking strip 310 is illustrated that the ego-machine is traveling adjacent to on the right side of path 302. In some embodiments, the virtual parking strip generator 210 may generate on the display 300 a virtual parking strip 314 on the right side of path 302 that the ego-machine has passed and/or a virtual parking strip 312 on the right side of path 302 that the ego-machine is about to enter. To the left of the ego-machine icon 305, a virtual parking strip 320 is illustrated that the ego-machine is traveling adjacent to on the left side of path 302. In some embodiments, the virtual parking strip generator 210 may generate on the display 300 a virtual parking strip 324 on the left side of path 302 that the ego-machine has passed and/or a virtual parking strip 322 on the left side of path 302 that the ego-machine is about to enter. It should be understood that in various implementation, the display 300 may include any one or more of the virtual parking strips 310, 312, 314, 329, 322, or 324, and in any combination.

In this example display 300, each of the virtual parking strips is shown to include virtual parking signs indicating their respective starting and ending boundaries. These virtual parking signs would be generated by the virtual parking strip generator 210 in response to the parking information detected from feature data 104, as discussed herein. In some embodiments, the graphics used for display of the virtual parking signs may be obtained by the virtual parking strip generator 210 from a virtual parking strip graphics library 222 that contains standardized representations of virtual parking signs and other features associated with corresponding parking rules. That is, once the virtual parking strip graphics library 222 determines what parking rule applies to a virtual parking strip, it can reference the correct graphic to display based on a combination of that parking rule and the characteristics of the detected feature. It should be understood that the particular virtual parking signs and their associated rules discussed for FIG. 3 are used for non-limiting illustrative purposes only.

As depicted in FIG. 3, the virtual parking strip 314, which the ego-machine has passed on the right side, is marked with begin no parking virtual parking sign 342 at its start boundary and an end no parking virtual parking sign 340 at its end boundary, indicating that no parking is permitted within the virtual parking strip 314. For the virtual parking strip 310, which the ego-machine is currently adjacent to, the first virtual parking sign 338 at its start boundary indicates that parking is permitted within the virtual parking strip 310. Note that in some embodiments, the generation of virtual parking signs 338 and 340 may have both been triggered by a common detected feature. For example, the detection of a parking permitted parking sign from the feature data 104 would imply that a previous parking rule of no parking is no longer applicable so that the end no parking virtual parking sign 340 and the begin parking permitted virtual parking sign 338 may both be generated. Similarly the end parking permitted virtual parking sign 336 could be generated based on an actual detection of an end parking permitted parking sign, or implicitly generated based on the change in parking rule indicated by the feature that triggered the generation of the no parking virtual parking sign 334 at the start of the next virtual parking strip 312. The virtual parking strip 312 is itself terminated (along with the applicability of the start of no parking rule of virtual parking sign 334) by the detection of an intersection as represented by the virtual parking sign 332.

The virtual parking strip 324, which the ego-machine has passed on the left side, is marked with begin no stopping virtual parking sign 362 at its start boundary and an end no stopping virtual parking sign 360 at its end boundary, indicating that no stopping or parking is permitted within the virtual parking strip 324. The virtual parking strip 320 provides an example of a virtual parking strip 324 that may be defined (both in length and type) from a parking rule generated from a single detected feature. For example, the detection of a feature comprising a bus stop sign may trigger the virtual parking strip generator 210 to generate a virtual parking strip 320 staring 50 feet prior to the detected feature, extending to 50 feet after the detected feature, and display of virtual parking signs 356 and 358 at the start and stop of the virtual parking strip 320 indicating that this parking strip is reserved for buses. The virtual parking strip 322 begins with a no stopping virtual parking sign 354 at its start boundary. In some embodiments, the no stopping virtual parking sign 354 may be generated based on detection of an actual feature indicating this parking rule, or may be based on continuing the no stopping rule in effect from virtual parking strip 324 prior to the bus stop. Virtual parking strip 322 is itself terminated (along with the applicability of the start of no stopping rule of virtual parking sign 354) by the detection of the intersection as represented by the virtual parking sign 352.

It should be noted that in various embodiments, virtual parking strips may be generated as described herein for paths that carry either one-way traffic or two-way traffic. In some embodiments, one of more of the virtual parking strips 310, 312, 314, 329, 322, or 324 may be generated from features facing the ego-machine 305 as it moves in the indicated direction of travel 307 and captured by front-view or surround sensors to detect parking strips. One of more of the virtual parking strips 310, 312, 314, 329, 322, or 324 may also be generated from features facing traffic traveling in the opposite direction on the path 302 as the ego-machine 305, and captured by rear-view or surround sensors to detect those parking strips. For example, where the path 302 carries two-way traffic where traffic keeps to the right, one of more of the right sided virtual parking strips 310, 312, 314 may be generated by the parking strip processor 102 from features facing the ego-machine 305 as it travels, and captured by front-view or surround sensors, and one of more of the left sided virtual parking strips 320, 322, 324 may be generated from features facing away from the ego-machine 305 as it travels, and captured by rear-view or surround sensors. The parking strip processor 102 would similarly implement the converse where the path 302 carries two-way traffic that keeps to the left, generating one or more left sided virtual parking strips 320, 322, 324 from features facing the ego-machine 305 as it travels, and one or more generating right sided virtual parking strips 310, 312, 314 from features facing away from the ego-machine 305 as it travels. In still other embodiments, the parking strip processor 102 may generate and display one or more virtual parking strips for adjoining paths other than the specific path traveled by the ego machine using front-view, rear-view, and/or surround, sensors. For example, in the case of a divided highway or boulevard, the parking strip processor 102 may generate and display virtual parking strips for the adjoining path based on captured features that apply to the adjoining path. Similarly, the parking strip processor 102 may generate and display virtual parking strips in the same way for adjoining service roads.

FIG. 4 is a flow diagram showing a method 400 for perception-based parking assistance, in accordance with some embodiments of the present disclosure. Each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the perception-based parking assistance system included in the process 100 of FIG. 1. However, this method 400 may additionally or alternatively be executed by any one system, or any combination of systems, including, but not limited to, those described herein. It should therefore be understood that the features and elements described herein with respect to the method 400 of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figured and/or embodiments described herein and vice versa.

Generally, the method 400 comprises determining a location of a real-world parking strip relative to an ego-machine and an associated parking rule for the parking strip using a virtual parking strip and one or more virtual parking signs generated based at least in part on one or more detected features in an environment of the ego-machine.

The method 400, at block B402, includes detecting, based at least in part on sensor data generated using one or more sensors of an ego-machine, one or more features indicative of parking information associated with at least a portion of a planned path of the ego-machine. As a non-limiting example, the one or more detected features indicative of parking information may comprise a sign, an intersection, a color of a surface along the path, specific objects, or a symbol on a surface along the path, or any other features implicating parking information, as discussed herein.

The method 400, at block B404, includes computing a geometry of a virtual parking strip based at least in part on the one or more features and tracked motion of the ego-machine. For example, the geometry of the virtual parking strip may be computed from a filtered set of features in tandem with the motion of the ego-machine, as discussed herein. The tracked motion of the ego-machine is used to extend the length of the virtual parking strip along the path of travel starting from the location of a first feature until one or more second features are perceived that indicate the end of the parking strip. The locations of the one or more second features may be used to generate a second virtual parking sign on the path and an ending boundary of the virtual parking strip.

The method 400, at block B406, includes associating a parking rule with the virtual parking strip based at least in part on the one or more features. That is, the parking rule may be determined at least in part from information obtained from the detected features. The parking rule can provide parking related information such as: parking is allowed within the virtual parking strip, stopping is allowed within the virtual parking strip, no parking is allowed within the virtual parking strip, or no stopping is allowed within the virtual parking strip. The parking rule may indicate times, dates, and/or other conditions under which the parking rule is applicable. Where parking or stopping is permitted, the parking rule may also indicate if that permission is subject to having a valid permit, such as a disabled parking permit, or if restricted to permitted residents, faculty, or by usage, such as for deliveries only.

The method 400, at block B408, includes generating a parking assistance output indicative of the parking rule and the relative position of the virtual parking strip with respect to the ego-machine. This parking assistance output may be used by one or more downstream components of the ego-machine, either to assist an operator in navigating the ego-machine, or as input to perform one or more automated operations for controlling the ego-machine through an environment.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
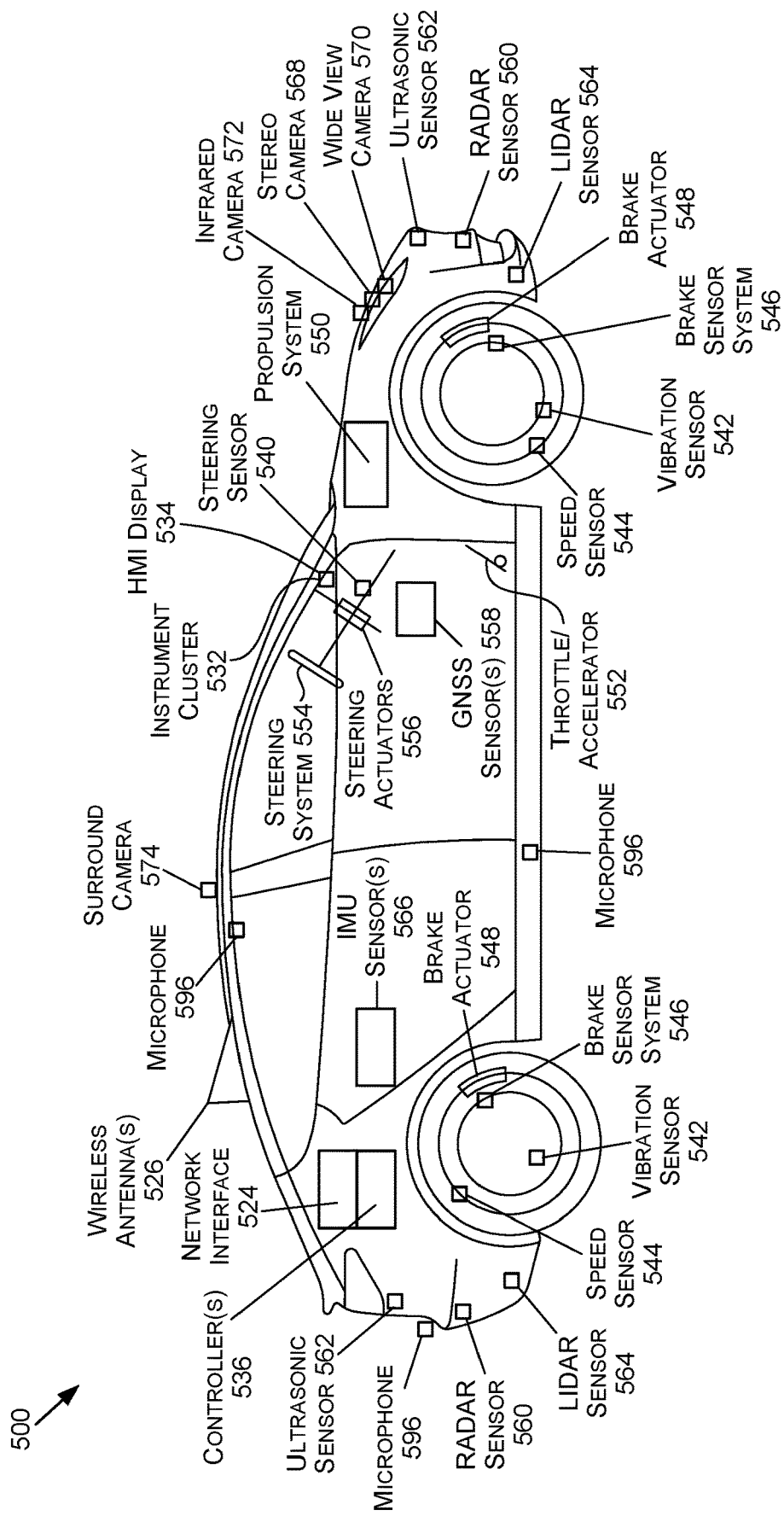
FIG. 5A is an illustration of an example autonomous vehicle, in accordance with some embodiments of the present disclosure.

FIG. 5A is an illustration of an example autonomous vehicle 500 implementation of an ego-machine comprising a perception-based parking assistance system 100 in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired (planned) path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types. Moreover, the controllers(s) 536 may receive the parking assistance output from the parking strip processor 102 indicative of the parking rule and the relative position of a virtual parking strip with respect to the ego-machine. With the parking assistance output controller(s) 536 may operate the vehicle 500 to navigate into valid parking or stopping parking strips, while avoiding parking strips when parking and/or stopping is not permitted.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). Moreover, the HMI display 534 may display the virtual parking strips generated by the parking strip processor 102, as shown and discussed above with respect to FIG. 3. The virtual parking strip generator 210 presents onto the HMI display 534 a graphical representation or icon of the ego-machine 305 traveling on a path 302 with an indicated direction of travel 307 and one or more virtual parking strips as detected in the proximity of the vehicle 500 with corresponding virtual parking signs.

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc. In some embodiments, the parking strip processor 102 periodically, or based on location of the vehicle 500, downloads parking rule data 216 via the network interface 524, such as to update its knowledge of local parking rules.

Figure 5B:
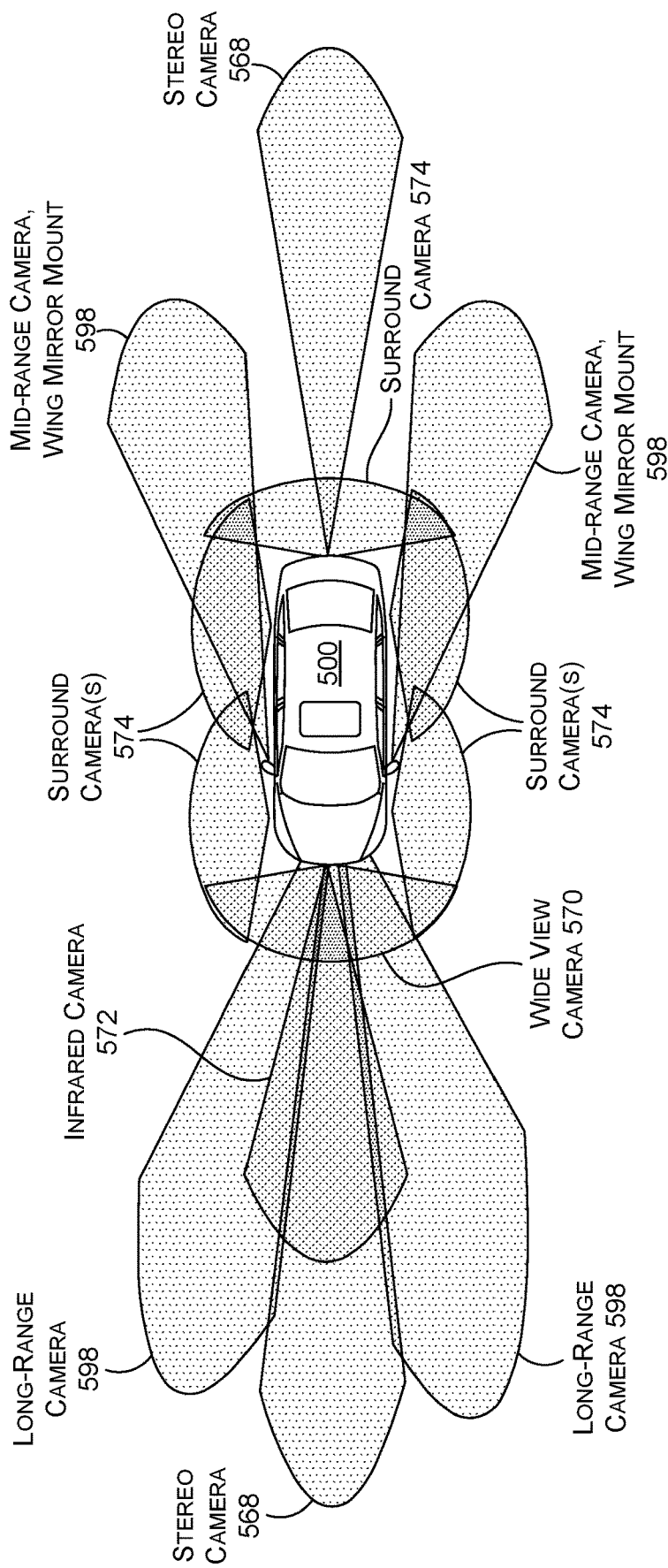
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500. Any one or more of such cameras as illustrated in FIG. 5B may be used as the sensor(s) 110 to capture the sensor data 108 that is ultimately input as feature data 104 to the parking strip processor 102.

The camera types for the cameras may include, but are not limited to, digital cameras that may be adapted for use with the components and/or systems of the vehicle 500. The camera(s) may operate at automotive safety integrity level (ASIL) B and/or at another ASTL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
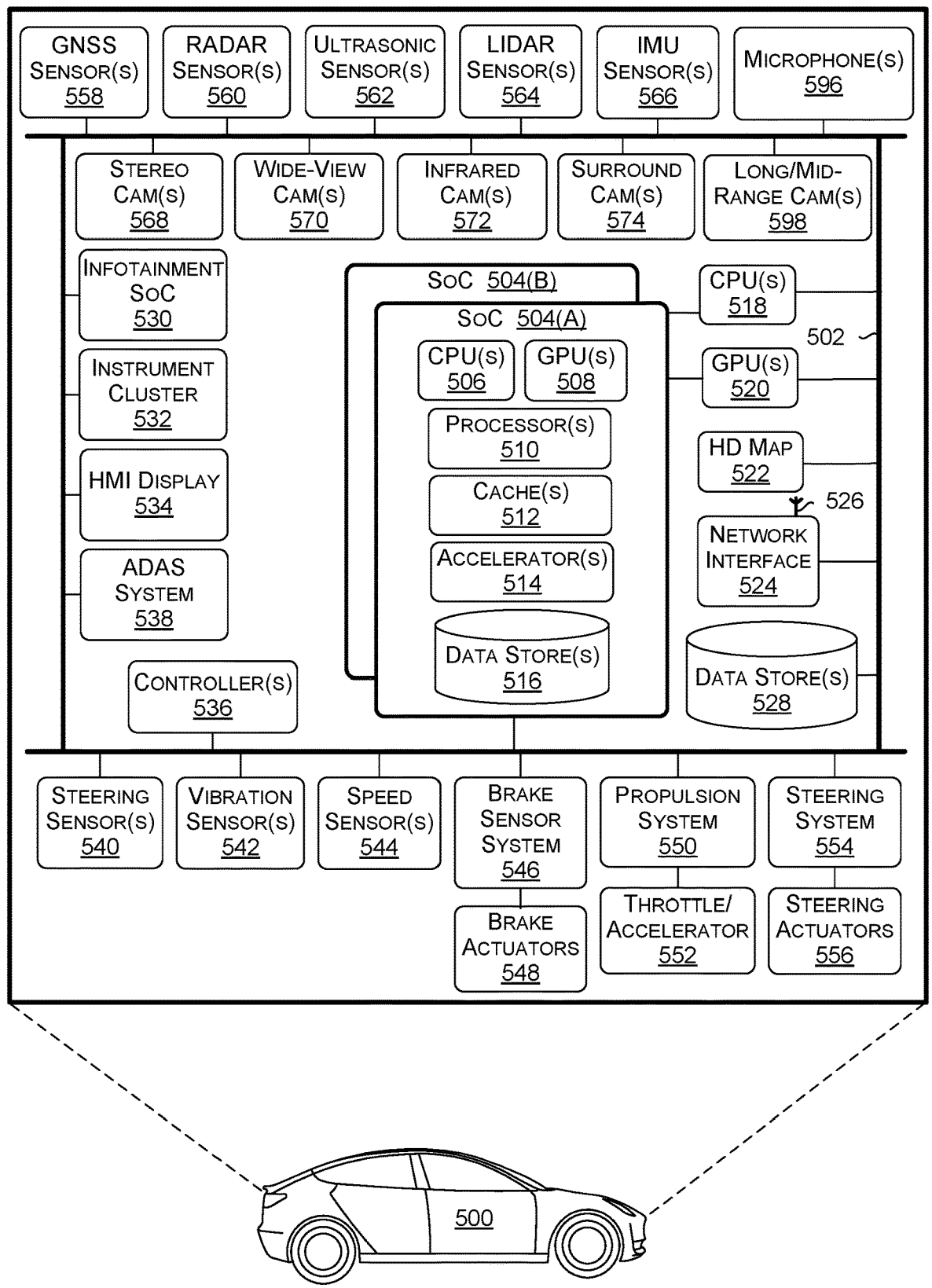
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like. For example, features and function of one or both of the parking strip processor 102 or the feature classifier 106 may be at least in part executed by the one or more controller(s) 536.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. For example, the one or more aspects of the feature classifier 106 may utilize accelerators 514 to generate the feature data 104 input to the parking strip processor 102. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In embodiments, such a confidence value may be used by the parking strip processor 102 in determining the degree to which a parking rule derived from perceived feature data 104 is trustworthy enough to be associated with a virtual parking strip. A parking rule with a high confidence value (e.g. at least meeting a confidence threshold) may be assigned to the virtual parking strip. A parking rule with a low confidence value (e.g. not meeting the confidence threshold) may be disregarded and a default parking rule assigned to the virtual parking strip.

In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge. In embodiments, the tracked motion data 112 may be at least in part generated from the output of the GNSS sensor(s) 558.

The vehicle 500 may further include RADAR sensor(s) 560. The RADAR sensor(s) 560 may be used by the vehicle 500 for long-range vehicle detection, even in darkness and/or severe weather conditions. In embodiments, RADAR sensor(s) 560 may serve as sensor(s) 110 for capturing sensor data 108 from which the feature data 104 is derived. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers. In embodiments, the tracked motion data 112 may be at least in part generated from the output of the IMU sensor(s) 566.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
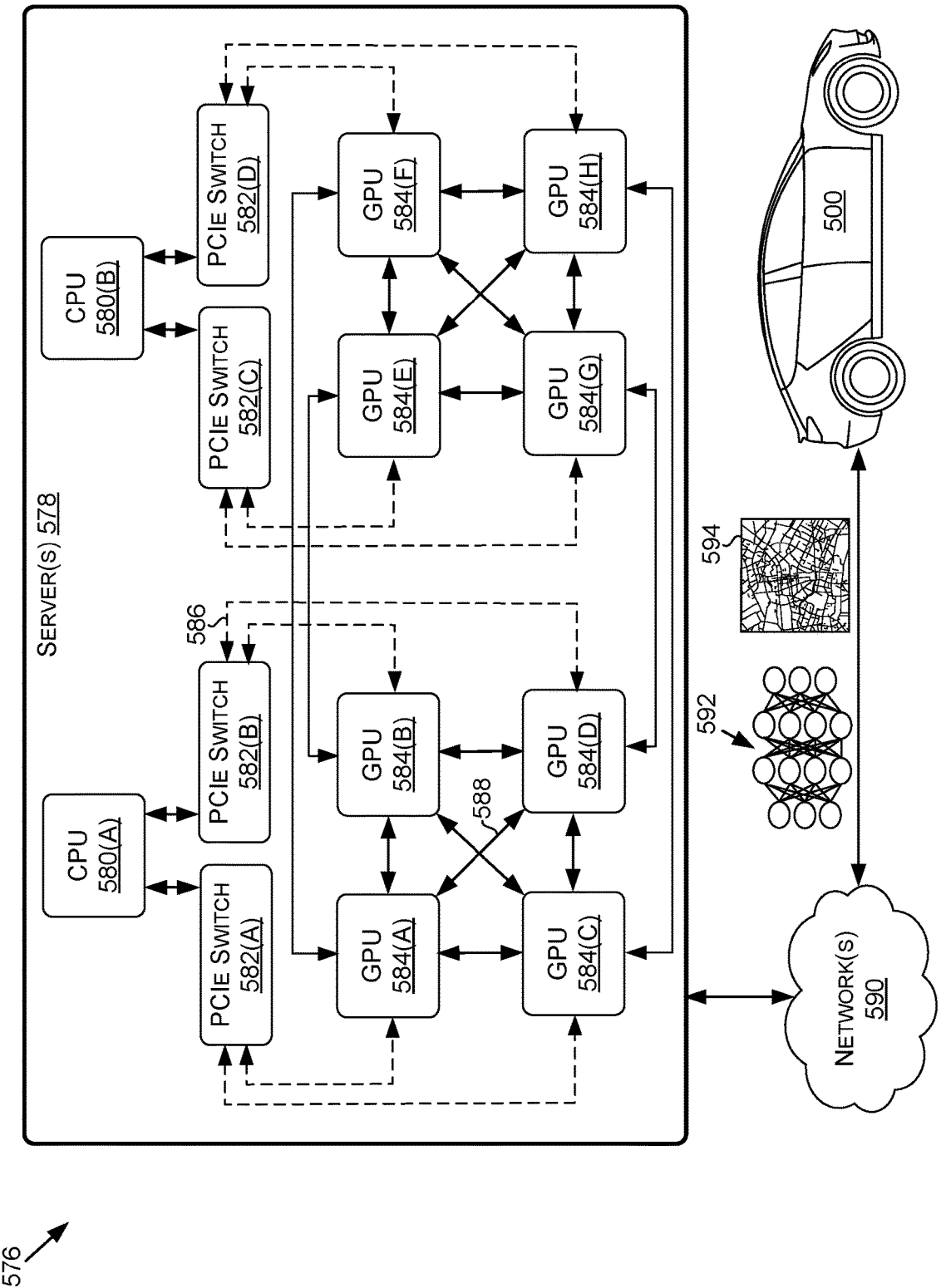
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be synthetically generated in a simulation (e.g., using a game engine), and/or as multi-dimensional (e.g., 2D or 3D) assets of a collaborative content creation platform for heterogeneous content creation applications. In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
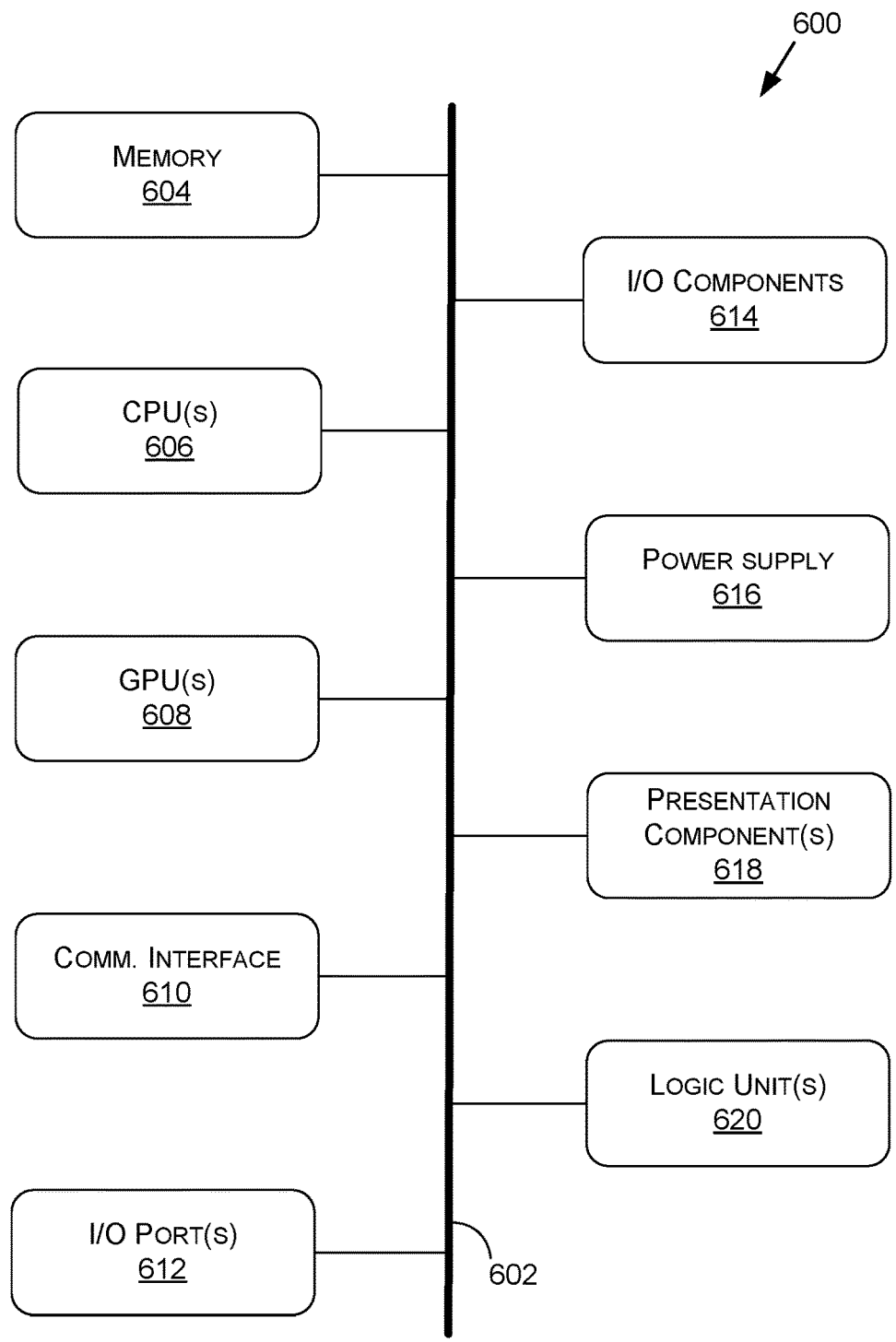
FIG. 6 is a block diagram of an example computing device suitable for use in implementing some embodiments of the present disclosure.

FIG. 6 is a block diagram of an example computing device(s) 600 suitable for use in implementing some embodiments of the present disclosure, for example, such as but not limited to the parking strip processor 102 and/or feature classifier 106. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. For example, one or more functions of the parking strip processor 102 and/or the feature classifier 106 may be implemented as code executed by the CPU(s) 606. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics), visual display of the parking assistance output from the parking strip processor 102 onto the HMI display 120, or perform general purpose computations. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs. In some embodiments, GPU(s) 608 may render elements of the virtual parking strips and virtual parking signs onto the HMI display 120 based on images from the virtual parking strip graphics library 222.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
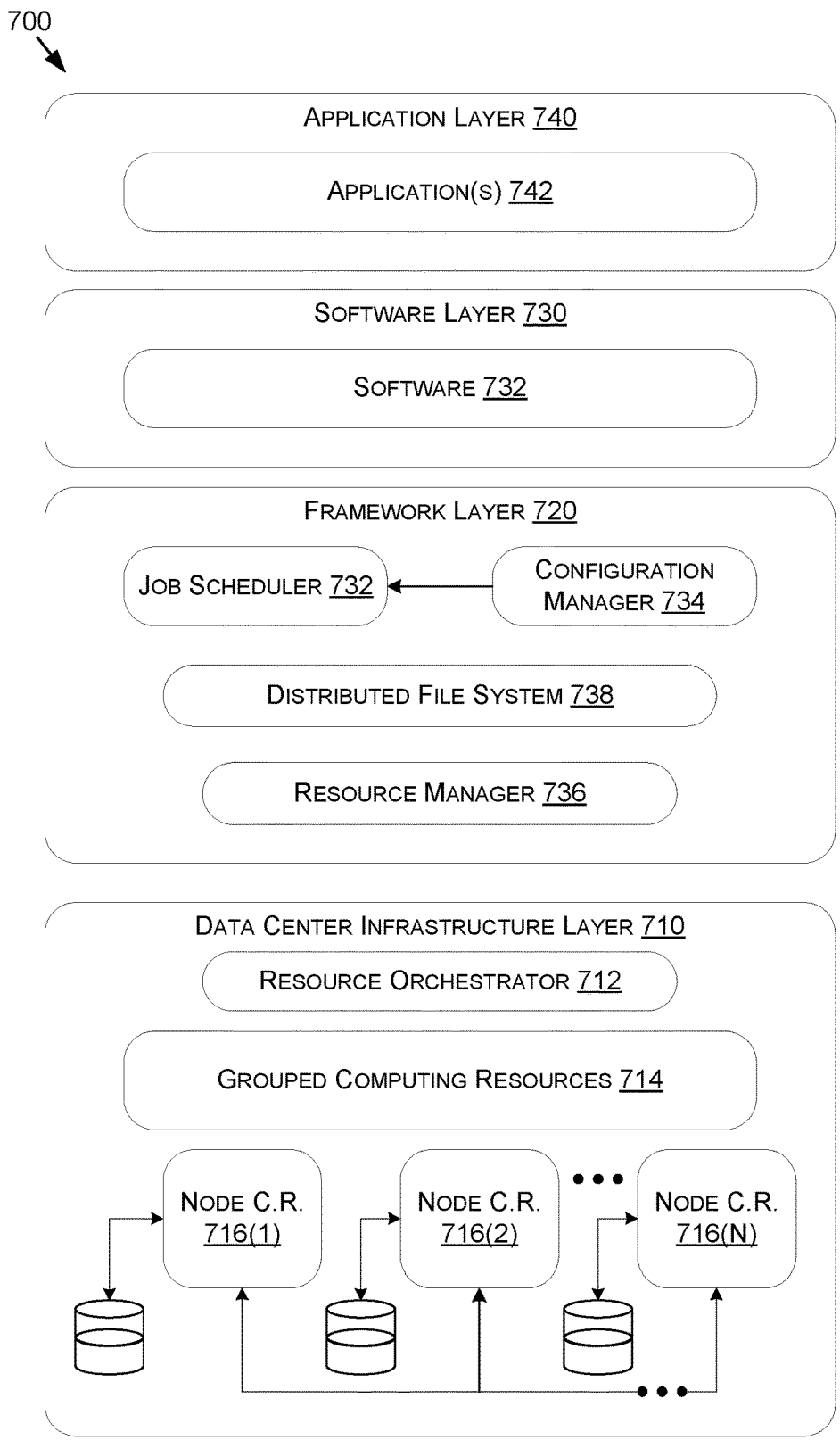
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740. The data center 700 may provide one or more services to the perception-based parking assistance system 100 (which can access the data center 700 via the wireless network interface 118). For example, the perception-based parking assistance system 100 may query the data center 700 to obtain local parking rule information based on the location of the ego-machine and/or receive updates to firmware, software or other information used for interpreting and/or displaying parking information from detected features in the feature data 104, or other capability upgrades.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733.

In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits configured to:
detect, based at least in part on sensor data generated using one or more sensors of an ego-machine, one or more features indicative of parking information associated with at least a portion of a planned path of the ego-machine;
compute a geometry of a virtual parking strip based at least in part on the one or more features and tracked motion of the ego-machine;
apply the one or more features to a neural-network based feature classifier to extract the parking information and determine a parking rule, the parking rule comprising an indication of a permission associated with at least one of parking or stopping within the virtual parking strip, wherein the parking rule is selected to be assigned to the virtual parking strip when the neural-network based feature classifier indicates a confidence in the parking rule associated with the virtual parking strip is above a threshold, or a default parking rule is selected to be assigned to the virtual parking strip when the confidence is not above the threshold;
associate the assigned parking rule with the virtual parking strip based at least in part on the one or more features;
generate a parking assistance output indicative of the parking rule and the relative position of the virtual parking strip with respect to the ego-machine; and
control one or more operations to assist in navigating the ego-machine based at least on the parking assistance output.

2. The at least one processor of claim 1, wherein the parking rule indicates at least on one of:
parking is allowed within the virtual parking strip;
stopping is allowed within the virtual parking strip;
no parking is allowed within the virtual parking strip;
no stopping is allowed within the virtual parking strip; or
parking is allowed within the virtual parking strip subject to permit.

3. The at least one processor of claim 1, wherein the one or more features comprise: a sign, an intersection, a color of a surface along the planned path, or a symbol on the surface along the planned path.

4. The at least one processor of claim 1, wherein the detection of the one or more features comprises:
filtering out at least one feature of the one or more features to generate a filtered set of features, the filtering being based at least in part on at least one of:
the at least one feature being outside of a trajectory manifold of the ego-machine;
the at least one feature being located on a different path than the ego-machine; or
a distance between the ego-machine and the at least one feature being greater than a threshold distance,
wherein the computation of the geometry of the virtual parking strip is executed using the filtered set of features.

5. The at least one processor of claim 1, wherein the computation of the geometry of the virtual parking strip comprises:
generating a starting boundary of the virtual parking strip based at least in part on a first location of a first feature of the one or more features indicating a start point of the virtual parking strip;
extending a length of the virtual parking strip along the planned path based on the tracked motion of the ego-machine until a second location of a second feature of the one or more features indicates a stop point of the virtual parking strip; and
generating an ending boundary of the virtual parking strip based at least in part on the second location.

6. The at least one processor of claim 5, wherein the computation of the geometry of the virtual parking strip further comprises:
computing the geometry of the virtual parking strip based at least in part on a relative location of the first location and the second location with respect to the ego-machine.

7. The at least one processor of claim 5, wherein the one or more circuits further comprise circuitry configured to:

generate a first virtual sign corresponding to the starting boundary of the virtual parking strip;

generate a second virtual sign corresponding to the ending boundary of the virtual parking strip; and store the first location, semantic information corresponding to the first virtual sign, the second location, and semantic information corresponding to the second virtual sign in memory of the ego-machine.

8. The at least one processor of claim 1, wherein the generation of the parking assistance output comprises causing display, on a display of the ego-machine, of a first graphic for a first virtual sign corresponding to a starting boundary of the virtual parking strip and a second graphic to a second virtual sign corresponding to an ending boundary of the virtual parking strip.

9. The at least one processor of claim 1, wherein the one or more circuits further comprise circuitry configured to:

generate a display that comprises at least one of: a first virtual parking strip that the ego-machine has passed, a second virtual parking strip that the ego-machine is traveling adjacent to, or a third virtual parking strip that the ego-machine is about to enter.

10. The at least one processor of claim 1, wherein the parking rule is based at least in part on parking rules associated with a geographic location of the ego-machine.

11. The at least one processor of claim 1, wherein the detection of the one or more features includes determining that the parking information is associated with at least the portion of the planned path based at least in part on estimating a distance between the one or more features and the planned path.

12. The at least one processor of claim 1, wherein the one or more circuits further comprise circuitry configured to:

maintain a history of previously computed virtual parking strips along the planned path in a memory of the ego-machine.

13. The at least one processor of claim 1, wherein the planned path comprises at least one of:
a paved road;
an unpaved road;
a highway;
a driveway;
a portion of a parking lot;
a trail;
a track;
a waterway;
a walking path;
a delineated portion of an environment; or
a flight route.

14. The at least one processor of claim 1, wherein the at least one processor is comprised in at least one of:
a control system for an autonomous or semi-autonomous machine;
a perception system for an autonomous or semi-autonomous machine;
a system for performing simulation operations;
a system for generating synthetic data using machine learning;
a system for generating multi-dimensional assets using a collaborative content creation platform;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

15. A system comprising:
one or more processors comprising processing circuitry configured to:
detect, based at least in part on sensor data obtained using one or more sensors, one or more features indicative of parking information associated with at least a portion of a planned path of an ego-machine;
compute a geometry of a virtual parking strip based at least in part on the one or more features and tracked motion of the ego-machine;
apply the one or more features to a neural-network based feature classifier to extract the parking information and determine a parking rule, the parking rule comprising an indication of a permission associated with at least one of parking or stopping within the virtual parking strip, wherein the parking rule is selected to be assigned to the virtual parking strip based at least on a confidence of the neural-network based feature classifier corresponding to the determined parking rule at least meeting a threshold, and a default parking rule is assigned to the virtual parking strip when the confidence is not above the threshold;
associate the assigned parking rule with the virtual parking strip based at least in part on the one or more features; and
perform one or more operations to assist in navigating the ego-machine based at least in part on the virtual parking strip and the associated parking rule.

16. The system of claim 15, wherein the one or more features comprise: a sign, an intersection, a color of a surface along the planned path, or a symbol on the surface along the planned path.

17. The system of claim 15, wherein the detection of the one or more features comprises:
filtering out at least one feature of the one or more features to generate a filtered set of features, the filtering being based at least in part on at least one of:
the at least one feature being outside of a trajectory manifold of the ego-machine;
the at least one feature being located on a different path than the ego-machine; or
a distance between the ego-machine and the at least one feature being greater than a threshold distance,
wherein the computation of the geometry of the virtual parking strip is executed using the filtered set of features.

18. The system of claim 15, wherein the computation of the geometry of the virtual parking strip comprises:
generating a starting boundary of the virtual parking strip based at least in part on a first location of a first feature of the one or more features indicating a start point of the virtual parking strip;
extending a length of the virtual parking strip along the planned path based on the tracked motion of the ego-machine until a second location of a second feature of the one or more features indicates a stop point of the virtual parking strip; and
generating an ending boundary of the virtual parking strip based at least in part on the second location.

19. The system of claim 18, wherein the computation of the geometry of the virtual parking strip further comprises:
computing the geometry of the virtual parking strip based at least in part on a relative location of the first location and the second location with respect to the ego-machine.

20. The system of claim 18, wherein the processing circuitry is further configured to:
- generate a first virtual sign corresponding to the starting boundary of the virtual parking strip;
- generate a second virtual sign corresponding to the ending boundary of the virtual parking strip; and
- store the first location, semantic information corresponding to the first virtual sign, the second location, and semantic information corresponding to the second virtual sign in memory of the ego-machine.

21. The system of claim 15, wherein the detection of the one or more features includes determining that the parking information is associated with at least the portion of the planned path based at least in part on estimating a distance between the one or more features and the planed path.

22. The system of claim 15, wherein the system is comprised in at least one of:
- a control system for an autonomous or semi-autonomous machine;
- a perception system for an autonomous or semi-autonomous machine;
- a system for performing simulation operations;
- a system for generating synthetic data using machine learning;
- a system for generating multi-dimensional assets using a collaborative content creation platform;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

23. A method comprising:
- determining a location of a real-world parking strip relative to an ego-machine and an associated parking rule for the real-world parking strip using a virtual parking strip and one or more virtual parking signs generated based at least in part on one or more detected features in an environment of the ego-machine, wherein the determining includes applying the one or more detected features to a neural-network based feature classifier to extract parking information and determine the associated parking rule, the associated parking rule comprising an indication of a permission associated with at least one of parking or stopping within the virtual parking strip, wherein the associated parking rule is selected to be assigned to the virtual parking strip based at least on a confidence of the neural-network based feature classifier in the associated parking rule at least meeting a threshold, and a default parking rule is selected to be assigned to the virtual parking strip when the confidence is not above the threshold; and
- controlling one or more operations to assist in navigating the ego-machine based at least on the parking assistance output.

24. The method of claim 23, wherein the one or more detected features comprise: a sign, an intersection, a color of a surface along a planned path, or a symbol on the surface along the planned path.

* * * * *